No. 896,756. PATENTED AUG. 25, 1908.
H. W. PLEISTER.
EXPANSION BOLT ANCHOR.
APPLICATION FILED DEC. 19, 1907.
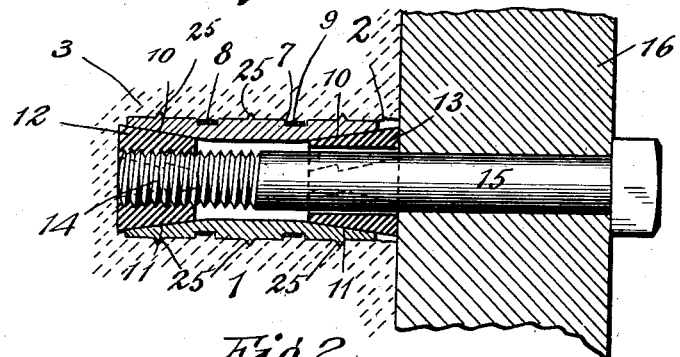
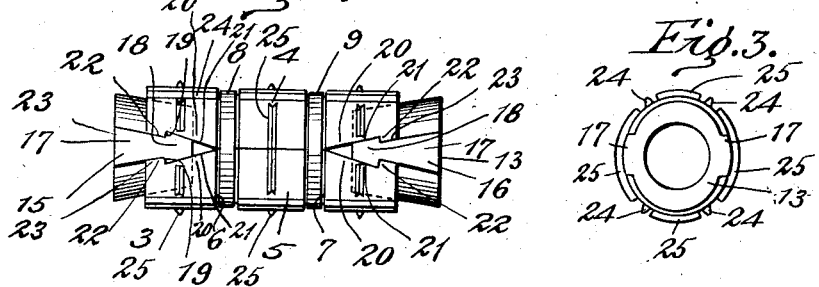 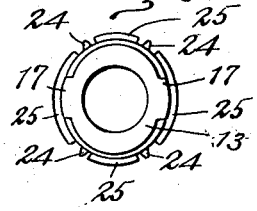
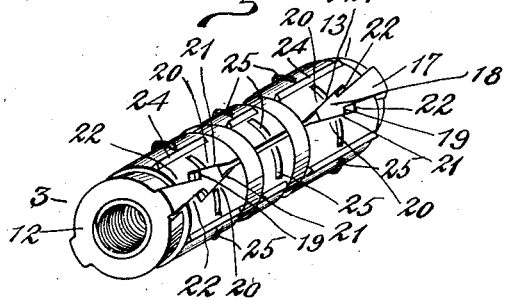
WITNESSES
J. J. Crocheron
Geo. Pulschen
INVENTOR
Henry W. Pleister
BY
Alan M. Johnson
ATTORNEY

UNITED STATES PATENT OFFICE.

HENRY W. PLEISTER, OF WESTFIELD, NEW JERSEY, ASSIGNOR TO HENRY B. NEWHALL, OF PLAINFIELD, NEW JERSEY.

EXPANSION BOLT-ANCHOR.

No. 896,756.    Specification of Letters Patent.    Patented Aug. 25, 1908.

Application filed December 19, 1907. Serial No. 407,125.

*To all whom it may concern:*

Be it known that I, HENRY W. PLEISTER, a citizen of the United States, and a resident of Westfield, in the county of Union and State of New Jersey, have invented certain new and useful Improvements in Expansion Bolt-Anchors, of which the following is a specification, taken in connection with the accompanying drawings, which form a part of the same.

This invention relates to expansion bolt anchors and more particularly to the means for expanding the shields and locking the parts together thereby preventing accidental separation of the parts in handling, shipping or in use.

In the accompanying drawings showing illustrative embodiments of this invention and in which the same reference numeral refers to similar parts in the several figures, Figure 1 is a longitudinal section of my bolt anchor, the parts being shown in operative position. Fig. 2 is a side elevation of the bolt anchor. Fig. 3 is an end elevation. Fig. 4 is a perspective view showing the parts slightly wedged apart for the purpose of better illustration.

In the illustrative embodiment of this invention shown in the drawing, 1 is a support of masonry or any other material in which a hole 2 has been drilled, or otherwise made, for the reception of the expansion bolt anchor 3. This bolt anchor has two expansion shields 4 and 5 respectively and circumferential depressed grooves 6 and 7 within which are mounted split spring rings 8 and 9 to yieldingly hold the two shields 4 and 5 together forming a substantially cylindrical exterior, all as is usual in such devices.

At each end of the shields 4 and 5 I form a flaring mouth by means of the incline or wedge surfaces 10 and 11, Fig. 1, which coöperate with the complementary wedge surfaces upon the nut 12 and sleeve 13. The nut 12 is screw-threaded to coöperate with the threads 14 upon the bolt 15 which, as shown in Fig. 1, supports a member 16.

To support and positively lock the nut 12 and sleeve 13 to the expansion shields and at the same time not interrupt or decrease the wedging surfaces 10 and 11 and the complementary wedging surfaces upon the nut and sleeve, I form on, or otherwise secure to, the nut and sleeve arrow heads, or notched wedge surfaces 15 and 16 respectively. I preferably employ two such arrow heads or wedge surfaces on each nut and sleeve arranged preferably 180 degrees apart. These arrow heads or wedge and locking surfaces each consist of a shank 17 having wedge surfaces, a head 18 having wedge surfaces and shoulders 19, 19 located between said wedge surfaces on the shank and head. Each of the shields 4 and 5 is cut away at 20, 20 to form half of a seat or bearing for the head 18 of the arrow head. These seats have ancillary wedge surfaces 21, 21 which are adapted to coöperate with the incline surfaces of the arrow head to assist in forcing the shields 4 and 5 apart, supplementing the wedging action of the incline surfaces 10 and 11 and the surfaces carried by the nut and sleeve.

On the edge and near the end of each shield, but not interrupting the incline wedge surfaces 10 and 11, I form lips 22, 22 which coöperate with the wedge surfaces on the shank 17 and with the shoulders 19, 19 on the arrow head locking the nut and sleeve to the shields 4 and 5 and preventing accidental disengagement of the parts of the expansion bolt anchor.

To insure easy insertion of the arrow head in its seat, against the action of the split spring rings 9 and 8, I preferably bevel or flare outwardly the lips 22, 22, as shown at 23. This surface 23 also coöperates with the wedge surfaces on the shank 17. To prevent the shields rotating in the hole 2 I preferably form longitudinal ribs 24, 24 upon their exterior surface and I may also use transverse ribs 25, 25, which will tend to prevent the withdrawal of the bolt from the support 1.

Having thus described this invention in connection with an illustrative embodiment thereof, to the details of which I do not desire to be limited, what is claimed as new and what it is desired to secure by Letters Patent is set forth in the appended claims.

1. In an expansion bolt anchor, the combination with an expansible member, an expanding member adapted to expand the expansible member, one or more arrow heads, consisting of a head having wedge surfaces and a shank having wedge surfaces, mounted upon the expanding member, and coöperating engaging surfaces upon the expansible member adapted to engage with the wedge surfaces upon the head and shank of the arrow head or arrow heads.

2. In an expansion bolt anchor, an expanding member, an arrow head carried by the expanding member, and wedge surfaces on the shank of the arrow head.

3. In an expansion bolt anchor, the combination of a plurality of shields, yielding means to hold the shields together, an expanding member, a lug on the expanding member having two sets of expanding wedges and surfaces on the shields for coöperating with the different wedge surfaces on the expanding member.

4. In an expansion bolt anchor, a plurality of shields, means to yieldingly hold the shields together, an expanding member, one or more arrow heads upon the expanding member, wedge surfaces on the shank of the arrow heads, surfaces on the shields to coöperate with the wedge surfaces of the arrow heads and lips on the shields to coöperate with the wedge surfaces on the shank of the arrow heads.

HENRY W. PLEISTER.

Witnesses:
MARGERY ADAMSON,
ALAN M. JOHNSON.